United States Patent
Liu et al.

(10) Patent No.: US 12,098,326 B2
(45) Date of Patent: Sep. 24, 2024

(54) DEGRADABLE FRICTION REDUCER FOR HYDRAULIC FRACTURING TREATMENTS

(71) Applicants: CNPC USA CORPORATION, Houston, TX (US); BEIJING HUAMEI, INC., Beijing (CN); CHINA NATIONAL PETROLEUM CORPORATION, Beijing (CN)

(72) Inventors: Fuchen Liu, Beijing (CN); Jianshen Li, Beijing (CN); Lijun Lin, Katy, TX (US); Jiangshui Huang, Sugar Land, TX (US); Genyao Lin, Houston, TX (US); Lulu Song, Houston, TX (US); Stephanie Yu, Houston, TX (US)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 0 days.

(21) Appl. No.: 18/485,860

(22) Filed: Oct. 12, 2023

(65) Prior Publication Data
US 2024/0043740 A1 Feb. 8, 2024

Related U.S. Application Data

(62) Division of application No. 17/885,251, filed on Aug. 10, 2022.

(60) Provisional application No. 63/260,187, filed on Aug. 11, 2021.

(51) Int. Cl.
C09K 8/68 (2006.01)
E21B 43/26 (2006.01)

(52) U.S. Cl.
CPC ............... *C09K 8/68* (2013.01); *E21B 43/26* (2013.01); *C09K 2208/28* (2013.01)

(58) Field of Classification Search
None
See application file for complete search history.

(56) References Cited

U.S. PATENT DOCUMENTS

| 7,677,315 B2 | 3/2010 | Saini | |
| 2005/0151286 A1* | 7/2005 | Liu | G02B 6/02038 264/1.38 |
| 2009/0105097 A1 | 4/2009 | Abad | |
| 2014/0251624 A1 | 9/2014 | Gupta | |
| 2015/0148269 A1* | 5/2015 | Tamsilian | C09K 8/588 507/225 |
| 2017/0313930 A1 | 11/2017 | Patel | |
| 2020/0224083 A1 | 7/2020 | Siddiqui | |
| 2021/0155846 A1 | 5/2021 | Xu | |

(Continued)

OTHER PUBLICATIONS

International Search Report and Written Opinion mailed Dec. 15, 2022 in corresponding PCT Application No. PCT/US22/40054.

(Continued)

*Primary Examiner* — John J Figueroa
(74) *Attorney, Agent, or Firm* — Hogan Lovells US LLP

(57) ABSTRACT

A polyacrylamide friction reducer wherein the friction reducer contains surfactant functional groups, and wherein the polyacrylamide friction reducer is degradable, can be used for multi-functional, slickwater fracturing fluid projects. Under downhole conditions, the polymer degrades and releases the surfactant molecules to act as oil displacing agent to provide additional stimulation.

5 Claims, 3 Drawing Sheets

(56) References Cited

U.S. PATENT DOCUMENTS

2021/0363409 A1\* 11/2021 Li ............................ C09K 8/68
2022/0025090 A1\* 1/2022 Zhang .................... C09K 8/584

OTHER PUBLICATIONS

Chen et al., "Synthesis and performance evaluation of a new drug reducer based on acrylamide/12-allyloxydodecyl acid sodium," Applied Polymer Science, Apr. 6, 2021, vol. 138, p. 1-12, abstract attached.

Li et al., "Polyacrylamide gifted polysaccharide as friction reducer for slickwater fracturing treatment," Journal of Macromolecular Science, Part A: Pure and Applied Chemistry, Nov. 6, 2020, vol. 58, Issue 4, p. 243-248.

Albernaz et al., "Active Ester Containing Surfmer for One-Stage Polymer Nanoparticle Surface Functionalization in Mini-Emulsion Polymerization," Apr. 6, 2018, Polymers, vol. 10, Issue 408, p. 1-16.

Jing et al., "Synthesis and performance evaluation of a new drag reducer-cationic hybrid polymeric based on polyacrylamide," Oct. 25, 2021, Journal of Polymer Research, vol. 28, Issue 435, p. 1-10.

Du et al., "A novel hydrophobically associating polymer based on Twin-tailed amphiphilic Monomer: Experimental study and molecular dynamics simulation," Aug. 27, 2021, Journal of Molecular Liquids, vol. 341, p. 1-10.

Office Action mailed Oct. 6, 2023 in corresponding U.S. Appl. No. 17/885,251.

\* cited by examiner

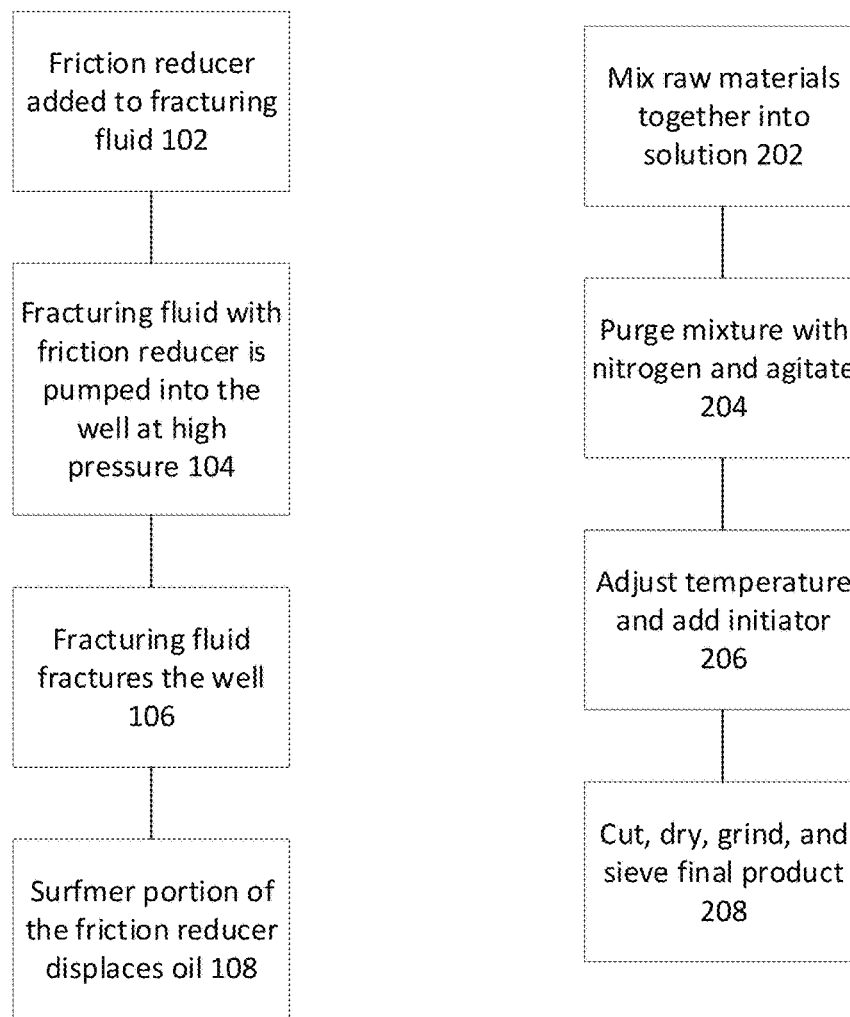

DEGRADABLE FRICTION REDUCER FOR HYDRAULIC FRACTURING TREATMENTS

CROSS REFERENCE TO RELATED APPLICATIONS

This application is a divisional application of U.S. patent application Ser. No. 17/885,251, titled "DEGRADABLE FRICTION REDUCER FOR HYDRAULIC FRACTURING TREATMENTS," filed Aug. 10, 2022, which claims priority to and the benefit of U.S. Provisional Application No. 63/260,187 titled "DEGRADABLE FRICTION REDUCER FOR HYDRAULIC FRACTURING TREATMENTS," filed Aug. 11, 2021, the full disclosure of which are hereby incorporated by reference in their entirety for all purposes and intents.

FIELD

The disclosure relates generally to the oil and gas industry. The disclosure relates specifically to a degradable friction reducer.

BACKGROUND

Pumping hydraulic fracturing fluid downhole creates friction between the fluid and associated pumping and piping components. The issue of friction is magnified due to the high flow rates and pressures used in hydraulic fracturing. Friction reducers are added to the hydraulic fracturing fluid to decrease friction and therefore reduce wear on equipment and piping. Friction reducers change the rheological properties of the hydraulic fracturing fluid to reduce friction in the fracturing fluid. Friction reducers can also be used where the movement of tools is limited by friction.

Traditional friction reducers only serve the purpose of reducing friction in a pumping system. Other additives are often required in the fracturing fluid to perform other tasks. One such example is an additive for displacing oil or other hydrocarbons within the well. In combination with the hydraulic fracturing, a displacing additive helps to displace hydrocarbons that are exposed by the fracturing within the wellbore, allowing for more efficient recovery of the hydrocarbons. Current displacement additives can often be absorbed into porous rock surfaces prior to reaching the fracturing site. The friction reducer and displacement additive are often two separate components and need to be added and balanced in the blending operation separately. It would be advantageous to have a friction reducer that has oil displacement functional groups chemically attached to the polymer that are able to be released with a delay.

SUMMARY

An embodiment of the disclosure is directed to polyacrylamide friction reducers for use in fracturing fluids. In some embodiments, the friction reducer can include a polyacrylamide polymer and one or more surfmers bonded to the polymer.

In an embodiment, a bond between the polyacrylamide polymer and the one or more surfmers can be degradable under downhole conditions. In some embodiments, the bond can be at the acrylate group of the polymer.

In some embodiments, the one or more surfmers can be poly(ethylene glycol) behenyl ether acrylate or methacrylate, lauryl polyethoxy (meth)acrylate, Cetyl polyethoxy (meth)acrylate and stearyl polyethoxy (meth)acrylate. In some other embodiments, the one or more surfmers can be derived from Tergitol 15-S-15, Poly(ethylene glycol) (19) tridecyl ether, DOWFAX 8390, glycolic acid ethoxylate oleyl ether, glycolic acid ethoxylate 4-nonylphenyl ether, an ether sulfonate, or an alkyl alkoxylated nonionic surfactant. In other embodiments, the one or more surfmers can be derived from an ether sulfonate or an alkyl alkoxylated nonionic surfactant. In another embodiment, the friction reducer can further include acrylic acid, 2-Acrylamido-2-methylpropane sulfonic acid (AMPS), or a salt form of AMPS (NaAMPS).

In another embodiment, the disclosure is directed to a method for fracturing a well. In some embodiments, this method can include reacting a polyacrylamide polymer with one or more surfmers to form a polyacrylamide friction reducer. In an embodiment, the friction reducer can be added to a well fracturing fluid. The friction reducer can reduce friction while pumping the fracturing fluid in some embodiments.

In an embodiment, the method further includes breaking the chemical bond between the polymer and one or more surfmers under downhole conditions. In some embodiments, the surfmers that break off from the friction reducer can displace hydrocarbons in the well.

In some embodiments, the friction reducer can be added to the fracturing fluid at concentrations of about 0.25 to 10 gallons per 1,000 gallons of fracturing fluid. In another embodiment, the method further includes reducing the interfacial tensions within the well.

In an embodiment, the disclosure is directed to a method of manufacturing a polyacrylamide friction reducer. In some embodiments, a 50% acrylamide, acrylic acid, NaOH, one or more surfmers, and water can be mixed together. In some embodiments, the pH can then be adjusted to between 5.5 and 7.0. In embodiments of the invention, the solution can be purged with nitrogen and agitated. In some embodiments, the temperature can be adjusted to between about 15-30 degrees C. In embodiments of the invention, one or more initiators can be added to react the solution into the friction reducer.

In some embodiments, the solution can further include sodium persulfate, sodium metabisulfite, V-50, or MEHQ. These can be added up to about 1 wt % of the solution in some embodiments.

In some embodiments, the solution can be agitated for at least 30 minutes. In other embodiments, the acrylamide can be present at about 25-40 wt %. In some embodiments, the solution can further include AMPS or NaAMPS. In alternate embodiments, the water can be present at about 30-60 wt %. In some embodiments, the surfmers can be present at about 1-10 wt %.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

FIG. 1 depicts a method of fracturing a wellsite according to an embodiment of the present invention;

FIG. 2 depicts a method of forming a friction reducer according to an embodiment of the present invention;

DETAILED DESCRIPTION

Figure 3:
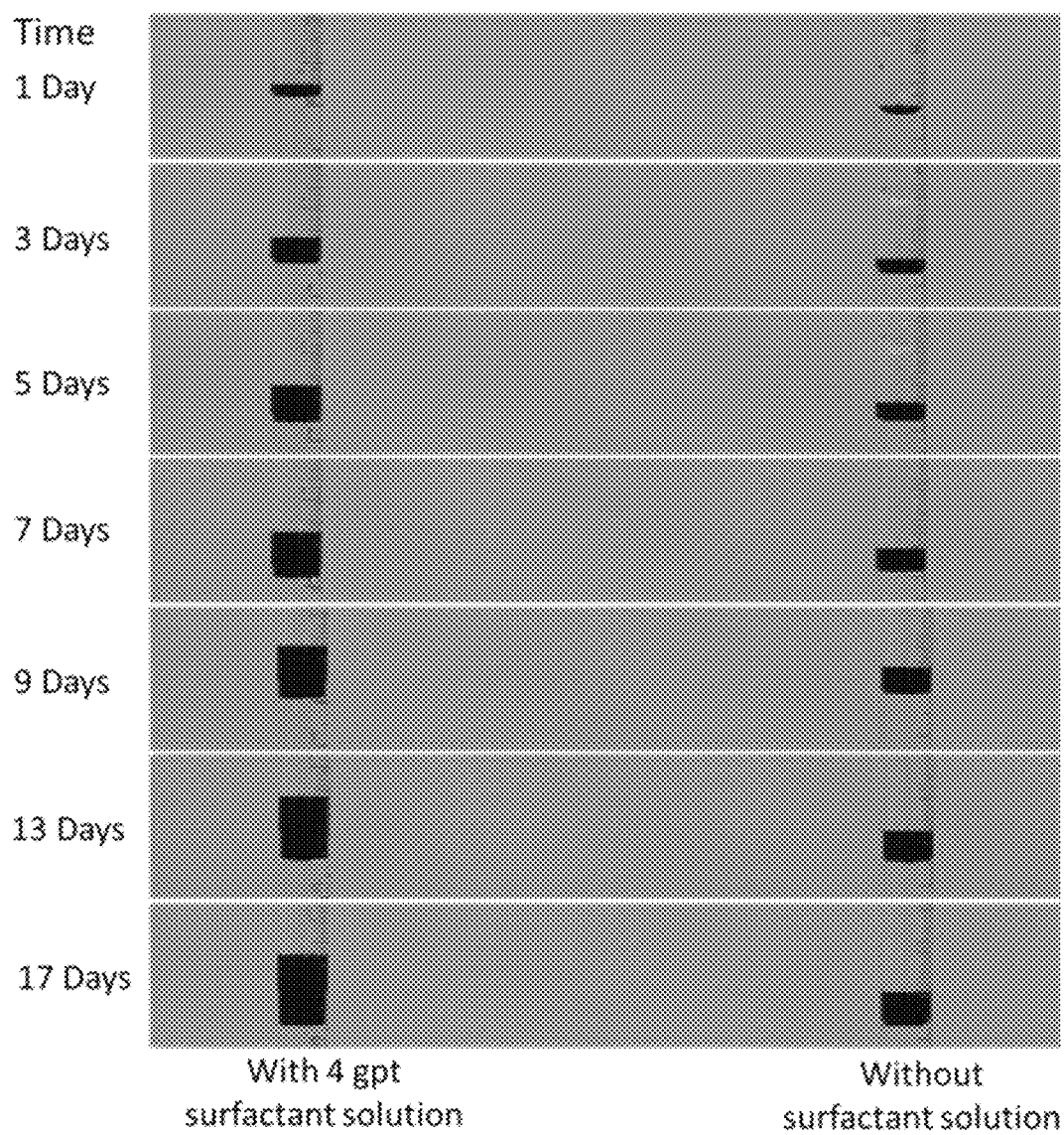
FIG. 3 depicts differences of oil recovery experiments with and without the hydrolyzed surfmer of the friction reducer of the present invention.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 11th Edition.

Disclosed herein is a polyacrylamide friction reducer that can contain oil displacement functional groups. Under downhole conditions or external triggers, the polyacrylamide-surfmer linkage can break, and the surfmer can be released from the friction reducer. This breakage can occur due to changes in temperature, pressure, or other trigger condition. The suitable surfmer can be one that can displace oil or other appropriate hydrocarbons. In some embodiments, the polymer to surfmer linkage can be an ester bond.

The degradable friction reducer can be used in fracturing treatments and is particularly beneficial to tight oil formations where an oil displacement surfactant can be utilized. An advantage of the degradable friction reducer is that it can be able to release the oil displacement surfactant with a delay. Because of this, the surfactant may not be prematurely absorbed into rock surfaces during pumping due to the bond with the polyacrylamide friction reducer. The surfactant can instead be delivered downhole with the polymer to the fracturing site. The degradable friction reducer can then be hydrolyzed to release oil displacement surfactant. The degradable friction reducer can therefore be one additive that serves two functions, providing friction reduction during pumping and displacing oil for recovery after fracturing. The friction reducer can be used in, including but not limited to, multi-functional, slickwater fracturing fluid projects.

In an embodiment, the friction reducer parent polymer can be a polyacrylamide family friction reducer. The friction reducer parent polymer can be polyacrylamide based anionic, cationic, or amphoteric family friction reducers.

In an embodiment of this disclosure, the polymerizable functional surfmer monomers or surfmers can be selected from poly(ethylene glycol) behenyl ether acrylate or methacrylate, lauryl polyethoxy (meth)acrylate, cetyl polyethoxy (meth)acrylate and stearyl polyethoxy (meth)acrylate. In the embodiments shown below, R can be a lauryl, cetyl, steryal, or another similar functional group.

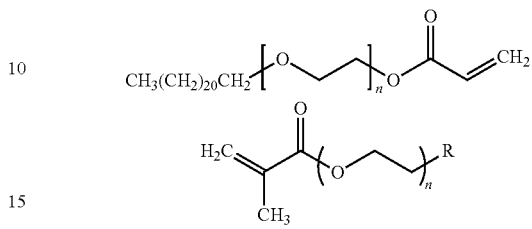

In an embodiment of this disclosure, the surfmers can be derived from the group consisting of: Tergitol 15-S-15, poly(ethylene glycol) (18) tridecyl ether, DOWFAX™ 8390, glycolic acid ethoxylate oleyl ether, and glycolic acid ethoxylate 4-nonylphenyl ether. Exemplary embodiments of the surfactants are shown below.

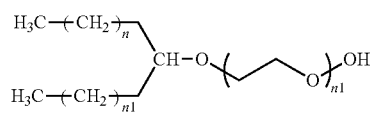

Tergitol
Tergitol 15-S-15
$C_{13}H_{27}(OCH_2CH_2)_nOH$
Poly(ethylene glycol) (18) tridecyl ether

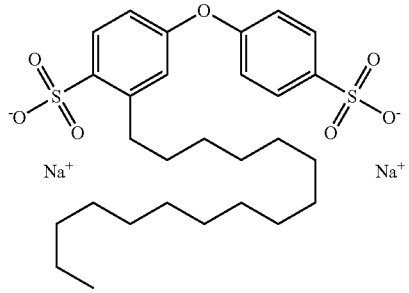

DOWFAX ™ 8390

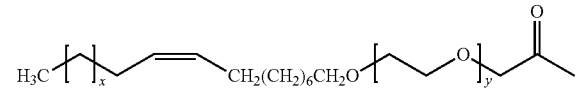

Glycolic acid ethoxylate oleyl ether

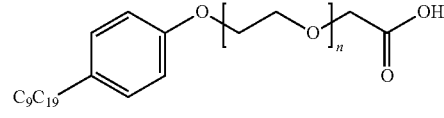

Glycolic acid ethoxylate 4-nonylphenyl ether

In another embodiment, the functional surfmers can be derived from an ether sulfonate (anionic surfmer) having the formula $R_1O(R_2O)_x(R_3O)_yCH_2CH(OH)CH_2SO_3M$, where $R_1$ is a linear or branched alkyl group having 5 to 30 carbon atoms, $R_2$ is —$CH_2CH_2$—, $R_3$ is —$CH(CH_3)CH_2$—, x is an integer from 2 to 30, y is an integer from 0 to 20, and M is a monovalent cation including, but not limited to, sodium, lithium, potassium or ammonium.

In some embodiments, the functional surfmers can be derived from an alkyl alkoxylated nonionic surfactant having the formula $R_4O(R_2O)_m(R_3O)_nH$, where $R_4$ is a linear or branched alkyl group having 5 to 30 carbon atoms, m is an integer from 5 to 30, and n is an integer from 1 to 20.

In an embodiment, the polymerizable surfmer can react with other monomers to attach the surfmer to the polymer backbone.

In one embodiment, the friction reducer can have the structure as shown below. In the embodiment below, R can be the degradable surfmer which can contain a degradable bond. In some embodiments, the degradable bond is an ester bond. In some embodiments, the anionic monomer can be 2-Acrylamido-2-methylpropane sulfonic acid (AMPS) or its salt form (NaAMPS).

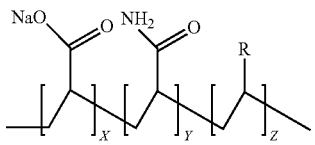

FIG. 1 is an embodiment of using the friction reducer as part of fracturing a wellsite. In step 102, the friction reducer can be added to a fracturing fluid. The friction reducer can be added at varying concentrations depending on the application. Exemplary concentrations can be at about 0.25 to 10 gallons friction reducer per 1,000 gallons of fracturing fluid. The fracturing fluid can then be pumped into the well at high pressures in step 104. During this pumping process, the friction reducer can act to reduce friction in the pumping system and piping due to the high pressures and flowrates of the fracturing fluid. This can help to reduce wear on the associated parts. During this process, the surfmer can remain bonded to the polymer. As such, the surfmer may not be able to be absorbed into a formation surface prematurely.

In step 106, the fracturing fluid fractures the well. At this time, the polyacrylamide-surfmer link can break, and the surfmer portion can be released under an external triggering condition. The triggering condition can be an increased temperature. The triggering condition can be a temperature similar to that found under downhole conditions. In a further embodiment, the condition can be a different triggering condition, such as pressure or pH.

In step 108, the surfmer can displace oil or other hydrocarbons in the well. This can increase the efficiency of hydrocarbon recovery from the fracturing location of the wellbore. Additionally, this can also increase the efficiency of the surfmer usage as the surfmer portion may not be prematurely absorbed into regions of the wellbore prior to reaching the fracturing location.

The friction reducer can be synthesized in the following manner. The friction reducer can comprise an acrylamide, an acrylic acid, NaOH, one or more surfmer, sodium persulfate, sodium metabisulfite, V-50, MEHQ, and water.

The acrylamide can be concentrated at or about 50% in the mixture. The acrylamide can comprise between about 25-50 wt % of the mixture.

The acrylic acid can also be AMPS or NaAMPS in some formulations. The acrylic acid, AMPS, or NaAMPS can comprise between about 5-10 wt % of the mixture.

The NaOH can comprise between about 5-10 wt % of the mixture. The one or more surfmers can comprise between about 1-10 wt % of the mixture. The water can comprise between about 30-60 wt % of the mixture.

The sodium persulfate, sodium metabisulfite, V-50, and MEHQ can be present at about 1 wt % at most for each in the mixture. In some embodiments, the sodium persulfate, sodium metabisulfite, V-50, and MEHQ may not be present in the mixture.

FIG. 2 is one embodiment of creating a friction reducer according to the present technology. The raw materials can be mixed together such that all solids are dissolved into solution in step 202. At this time, the pH can be adjusted to between about 5.5 to 7.0. The mixture can then be purged with nitrogen while agitated in step 204. This can occur for at least 30 minutes. The temperature can then be adjusted to between about 15-30 degrees Celsius. An initiator can be added to the solution and the reaction can be allowed to occur without cooling in step 206. The resulting polymer can then be cut, dried, grinded, and sieved to obtain the final dry powder product in step 208.

EXAMPLE

Experiment 1

In a first experiment poly(ethylene glycol) behenyl ether methacrylate was hydrolyzed with a concentration of 21.6% in alkaline water overnight at room temperature that generated Poly(ethylene glycol) behenyl ether surfactant. The interfacial tensions between crude oil and 2 wt % KCl with and without 4 gpt (gallon per thousand gallons) Poly(ethylene glycol) behenyl ether surfactant solution generated were measured respectively at 140° F. with a "KRUSS spinning drop tensiometer SDT". The API gravity of the crude oil was 41.7 degrees. With and without the hydrolyzed surfmer solution, the interfacial tensions measured were 1.24 mN/m and 10.64 mN/m, respectively.

Figure 4:
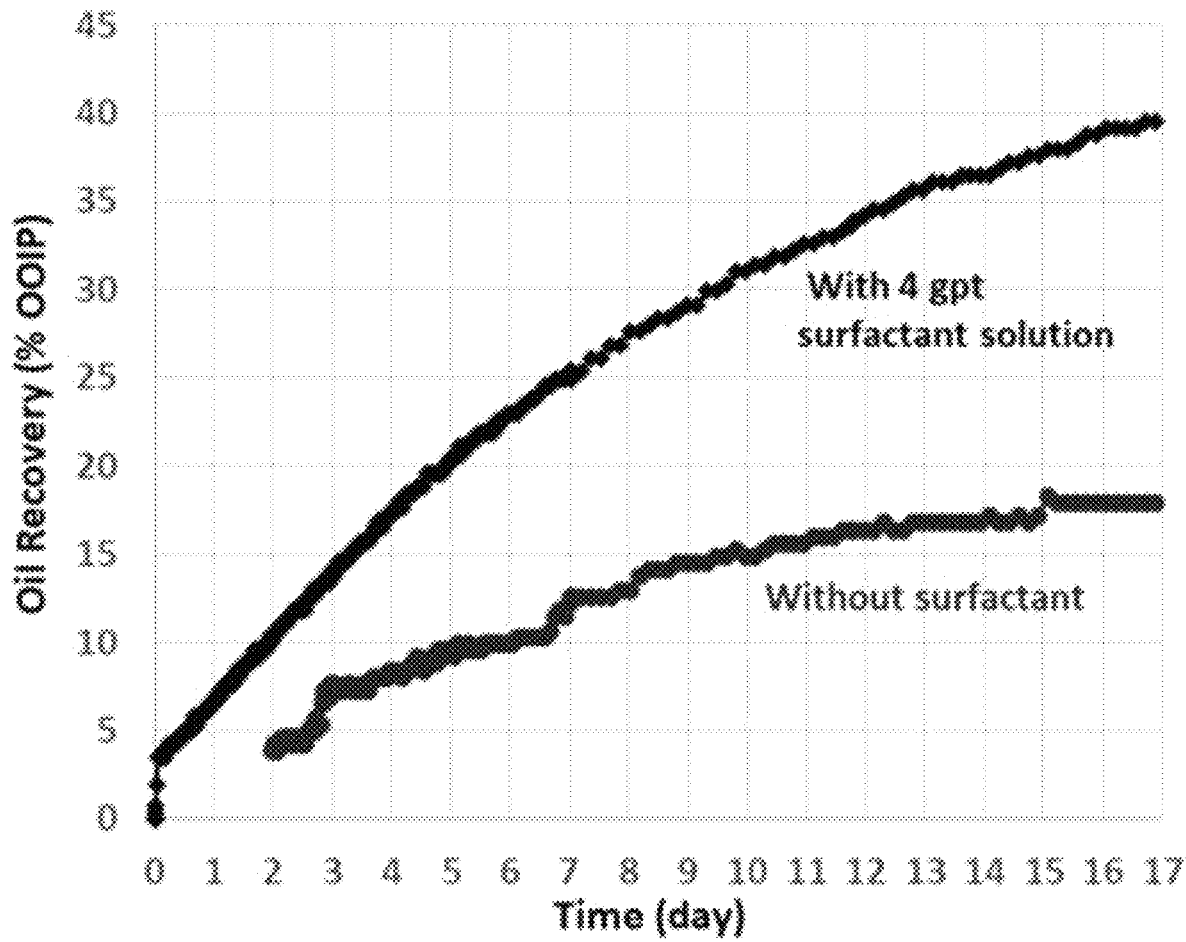
FIG. 4 is recorded oil recovery test data with and without the hydrolyzed surfmer of the friction reducer of the present invention.

Spontaneous imbibition tests as oil recovery tests were used to evaluate the performance of the hydrolyzed surfmer solutions on improving oil recovery. Parker sandstone cores with porosity and permeability about 14% and 6 and respectively were used for the spontaneous imbibition tests. The cores were dried for 24 hours at 176 degrees F., saturated with crude oil with an API gravity of 41.7 degrees after fully vacuumed, aged at 176 degrees F. for 3 months, and then used for the spontaneous imbibition tests. FIG. 3 compares the volumes of oil recovered at different times and FIG. 4 compares the cumulative oil recovery rates of the spontaneous imbibition tests at 140 degrees F. for 2 wt % KCl with and without 4 gpt Poly(ethylene glycol) behenyl ether surfactant solution generated through hydrolysis. At 17 days, the cumulative oil recovery rates are 39.5% OOIP and 17.9% OOIP in 2 wt % KCl with and without the surfactant solution, respectively.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method of fracturing a well comprising:
   reacting acrylamide and other monomers with one or more surfmers to form polyacrylamide friction reducer;
   adding the polyacrylamide friction reducer to a well fracturing fluid;
   pumping the well fracturing fluid into the well; and
   reducing the friction within the well with the polyacrylamide friction reducer.

2. The method of claim 1 further comprising:
   breaking chemical bonds between the polyacrylamide polymer and the one or more surfmers under downhole conditions.

3. The method of claim 2 wherein the one or more surfmers released from the polyacrylamide polymer displace hydrocarbon in the well.

4. The method of claim 1 wherein the polyacrylamide friction reducer is added to the well fracturing fluid at a concentration of about 0.25 to 10 gallons friction reducer per 1,000 gallons of fracturing fluid.

5. The method of claim 2 further comprising:
   reducing the interfacial tensions within the well.

* * * * *